(12) United States Patent
Lin

(10) Patent No.: US 9,178,874 B2
(45) Date of Patent: Nov. 3, 2015

(54) METHOD, DEVICE AND SYSTEM FOR LOGGING IN THROUGH A BROWSER APPLICATION AT A CLIENT TERMINAL

(71) Applicant: Tencent Technology (Shenzhen) Company Limited, Shenzhen (CN)

(72) Inventor: Xiaodan Lin, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/181,324

(22) Filed: Feb. 14, 2014

(65) Prior Publication Data

US 2014/0380426 A1  Dec. 25, 2014

Related U.S. Application Data

(63) Continuation of application No. PCT/CN2013/088862, filed on Dec. 9, 2013.

(30) Foreign Application Priority Data

Jun. 20, 2013  (CN) .......................... 2013 1 0247648

(51) Int. Cl.
*G06F 21/00* (2013.01)
*H04L 29/06* (2006.01)
*G06F 21/31* (2013.01)

(52) U.S. Cl.
CPC .............. *H04L 63/083* (2013.01); *G06F 21/31* (2013.01)

(58) Field of Classification Search
CPC .......... G06Q 40/00; G06Q 40/08; H04L 9/00; H04L 9/30; H04L 9/0825; H04L 9/083; H04L 9/3231; H04L 63/067; H04L 9/321; H04L 63/063; H04L 63/0807; H04L 9/0841; H04L 9/3213; H04L 9/302; H04L 9/3249; H04L 63/061; H04L 63/083; H04L 63/062; H04L 67/02; G06F 1/00; G06F 21/33; G06F 21/31; G06F 7/04; G06F 21/00

USPC .......... 726/2, 4, 10; 713/155; 380/255; 705/4
See application file for complete search history.

(56) References Cited

U.S. PATENT DOCUMENTS

| | | | |
|---|---|---|---|
| 6,763,468 B2 * | 7/2004 | Gupta et al. ...................... | 726/2 |
| 7,409,543 B1 * | 8/2008 | Bjorn ............................. | 713/155 |
| 7,818,792 B2 * | 10/2010 | Shamsaasef et al. ........... | 726/10 |
| 2012/0016695 A1 * | 1/2012 | Bernard et al. .................. | 705/4 |

FOREIGN PATENT DOCUMENTS

| | | |
|---|---|---|
| CN | 101427511 A | 5/2009 |
| CN | 102315945 A | 1/2012 |
| CN | 103095666 A | 5/2013 |

OTHER PUBLICATIONS

Tencent Technology, ISR, PCT/CN2013/088862, Feb. 20, 2014, 3 pgs.

\* cited by examiner

*Primary Examiner* — Thanhnga B Truong
(74) *Attorney, Agent, or Firm* — Morgan, Lewis & Bockius LLP

(57) ABSTRACT

The current invention discloses methods, devices and systems for logging in a third party server through a browser application at a client terminal. After receiving a validation request from a third party server, the main server for the browser application may choose to grant or deny the request. The validation request, which may include a third party identifier, a user identifier, and a session key, can be triggered by a data access request from the browser application. If there is an active communication session between the client terminal and the server, the server may send an authorization request to the third party so that the third party server allows the client terminal to access non-sensitive data associated with the user identifier through the browser application without further validation of the data access request. The current invention provides additional convenience and security for third party login operations.

17 Claims, 7 Drawing Sheets

METHOD, DEVICE AND SYSTEM FOR LOGGING IN THROUGH A BROWSER APPLICATION AT A CLIENT TERMINAL

RELATED APPLICATIONS

This application is a continuation application of PCT Patent Application No. PCT/CN2013/088862, entitled "METHOD, DEVICE AND SYSTEM FOR LOGGING IN THROUGH A BROWSER APPLICATION AT A CLIENT TERMINAL" filed Dec. 9, 2013, which claims priority to Chinese Patent Application No. 201310247648.4, "METHOD, DEVICE AND SYSTEM FOR LOGGING IN THROUGH A BROWSER APPLICATION AT A CLIENT TERMINAL" filed Jun. 20, 2013, both of which are hereby incorporated by reference in their entirety.

FIELD OF THE INVENTION

The present application relates to the field of network technology, and in particular to methods, devices and systems for logging in through a browser application at a client terminal.

BACKGROUND OF THE INVENTION

With the diversification of network technologies, the same company usually can provide the user with different kinds of services. Due to the extended business scope of the service providers, a user can register a user name and password with a certain business and use the same user name and password to access other businesses offered by the same service provider. With a terminal device, the most general situation is that when a user is using a browser application, the user may access websites and services provided by the same service provider for the browser application, using the same registration information for the browser application. Such an approach allows the user to log in the websites with an abbreviated process, providing significant convenience.

Taking smart phone browser as an example, the browser application at a client terminal has an account center, which can be used by a user to log in the browser application with a user name and password. After logging in successfully, the user can access other businesses operated by the same service provider for the browser application, and such businesses may include social networking sites, bulletin boards, microblogs, audio applications and group shopping sites without entering the user name and password again. Such an approach allows the user to have rapid login without the repetitive entry of user names and passwords, providing significant convenience.

However, in the process of developing the present application, the inventors find that the existing technology has at least the following problems:

The browser application can only provide the rapid login service for businesses from the same service provider. When the user is trying to access third party websites and/or businesses through the browser application at the client terminal, the user cannot use the account information—user name, password, and/or communication key—that have been established for the browser application. In other words, the account center of the browser application cannot automatically provide the login information to the third-party servers, preventing the user from logging in third party websites rapidly. Therefore, the existing rapid login service has great limitations. When trying to log in a third party website, the user needs to enter user name and password again. The whole process can be redundant, labor intensive, and error prone.

Accordingly, it is necessary and desirable to provide a new technology, so as to resolve the technical problem and improve the above-mentioned approach.

SUMMARY

The above deficiencies and other problems associated with logging in third party websites are reduced or eliminated by the invention disclosed below. In some embodiments, the invention is implemented in a computer system that has one or more processors, memory and one or more modules, programs or sets of instructions stored in the memory for performing multiple functions. Instructions for performing these functions may be included in a computer program product configured for execution by one or more processors.

One aspect of the invention involves a computer-implemented method performed by a computer system. The computer system, such as a server, may receive a validation request from a third party server, wherein the validation request is triggered by a data access request from the browser application at the client terminal to the third party server and the validation request comprises a third party identifier, a user identifier, and a session key. After determining whether there is an active communication session between the server and the client terminal corresponding to the session key, the computer system may send an authorization request to the third party server based on the third party identifier, in accordance with a determination that the communication session is an active session, wherein the authorization request includes the session key, and the third party server is configured to allow the client terminal to access a predefined portion of data associated with the user identifier through the browser application without further validating the data access request.

Another aspect of the invention involves a computer system, such as a server. The computer system may comprise one or more processors, memory, and one or more program modules stored in the memory and configured for execution by the one or more processors, the one or more program modules including: a receiving module configured to receive a validation request from a third party server, wherein the validation request is triggered by a data access request from the browser application at the client terminal to the third party server and the validation request comprises a third party identifier, a user identifier, and a session key; a determination module configured to determine whether there is an active communication session between the server and the client terminal corresponding to the session key; and a sending module configured to send an authorization request to the third party server based on the third party identifier, in accordance with a determination that the communication session is an active session, the authorization request including the session key, wherein the third party server is configured to allow the client terminal to access a predefined portion of data associated with the user identifier through the browser application without further validating the data access request.

Another aspect of the invention involves a non-transitory computer readable storage medium having stored therein instructions, which, when executed by a computer system, cause the computer system to: receive a validation request from a third party server, wherein the validation request is triggered by a data access request from the browser application at the client terminal to the third party server and the validation request comprises a third party identifier, a user identifier, and a session key; determine whether there is an active communication session between the server and the client terminal corresponding to the session key; and in accordance with a determination that the communication session is an active session, send an authorization request to the third party server based on the third party identifier, the authorization request including the session key, wherein the third party server is configured to allow the client terminal to access a predefined portion of data associated with the user identifier through the browser application without further validating the data access request.

Some embodiments may be implemented on one or more computer devices in a network environment.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 1:
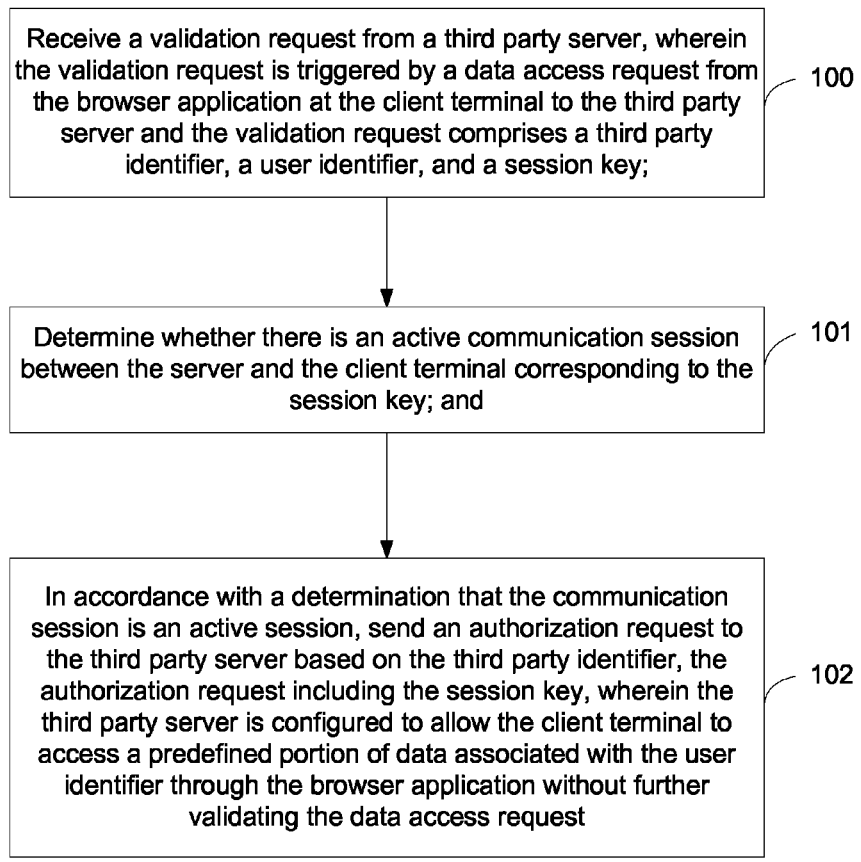
FIG. 1 is a flowchart illustrative of an information processing method conducted by a main server in accordance with some embodiments of the current invention.
Figure 2:
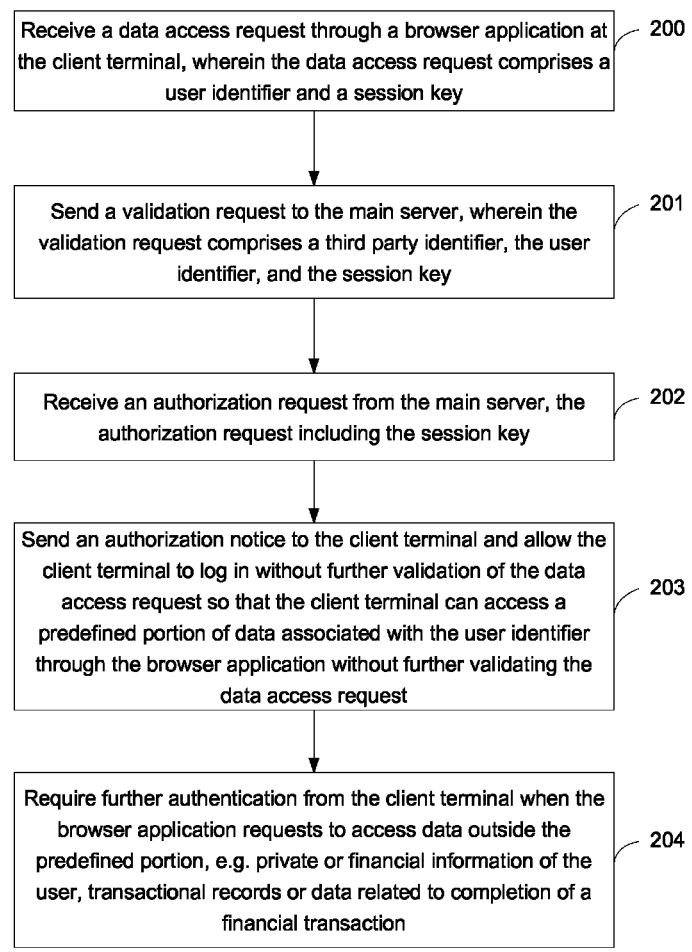
FIG. 2 is a flowchart illustrative of an information processing method conducted by a third party server in accordance with some embodiments of the current invention.
Figure 3:
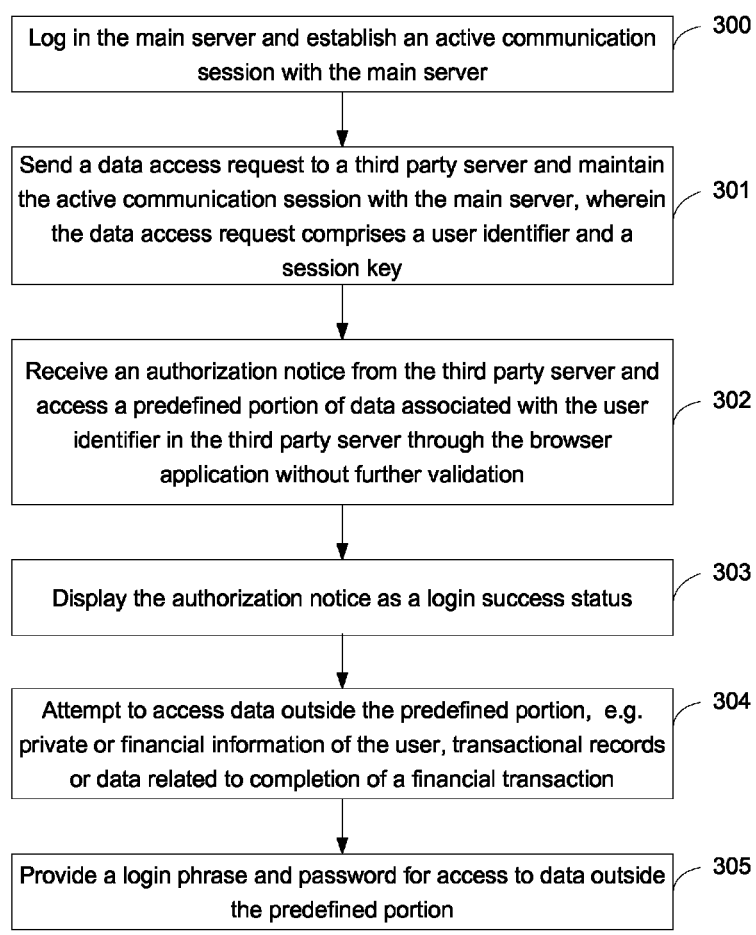
FIG. 3 is a flowchart illustrative of an information processing method conducted by a client terminal in accordance with some embodiments of the current invention.

FIG. 1 is a flowchart illustrative of an information processing method conducted by a main server in accordance with some embodiments of the current invention. FIG. 2 is a flowchart illustrative of an information processing method conducted by a third party server in accordance with some embodiments of the current invention. FIG. 3 is a flowchart illustrative of an information processing method conducted by a client terminal in accordance with some embodiments of the current invention. The methods shown by the Figures may be integrated in some embodiments. However, it should be noted that a method shown in a particular Figure may also be performed independently from the methods in other Figures.

As shown by step 100 of FIG. 1, a computer system, such as a main server, may receive a validation request from a third party server, wherein the validation request is triggered by a data access request from the browser application at the client terminal to the third party server and the validation request comprises a third party identifier, a user identifier, and a session key.

The computer system may be any computing device that has networking and data processing capabilities, such as but not limited to servers, workstations, personal computer such as desktops and laptops, and mobile devices. Here the term "main server" may be used to refer to the computer system that manages how a user account through the browser application may be utilized to access other sources, such as third party servers. The term is adopted partly to distinguish from other servers, such as the third part server. Similarly, the third party server may be any computing device that has networking and data processing capabilities. The client terminal may be any kind of computing devices such as but not limited to workstations, personal computers (PC), smart phones (e.g. Android® or IOS® phones), tablet computers, and personal digital assistants (PDAs). The main server, the third party server, and the client terminal are connected via network connections, such as the internet.

A user may have a registered account for the browser application, wherein access through the registered account of the browser application is managed by the main server. As shown in step 300 of FIG. 3, the client terminal may log in the main server and establish an active communication session with the main server through the browser application. "Log in" generally refers to an authentication process that verifies the user's identity and/or the client terminal's identity. In some embodiments, the user's identity may be verified by providing correct login phrase, such as a user name, and a password. In some embodiments, the client terminal's identity may be verified by providing a unique identifier (UDID). The specific login requirement for specific accounts may vary based on the authentication setup of the main server. In some embodiments, the term account information may refer to a combination of information items associated with the account, wherein such information items may include the user name and password, as well as related authentication information for the user and/or the client terminal.

As shown by step 301 of FIG. 3 and step 100 of FIG. 1, the client terminal may send a data access request to a third party server, wherein the data access request comprises a user identifier and a session key. Correspondingly, as shown by step 200 of FIG. 2, the third party server may receive the data access request from the client terminal through the browser application.

When a user is using the browser application, he/she may want to access a specific website which provides information and/or services. In some embodiments, the user may click a hyperlink of the website or enter a uniform resource locator (URL, or web address) to access the website. In some embodiments, the website may require the user to have a registered account to have full or partial access. For example, a shopping website may allow an anonymous user to browse through the lists of merchandise without any login. However, the same website may require a user to log in before accessing more personalized data, such as browsing history, buying records, user profile such as name and address, and information related to financial transactions such as credit card information. In addition, a website may have different layers of data that require different level of authentications and verification. For example, the shopping website may set different authentication standards for access to general merchandise information, personal information such as user name, and more sensitive information such as credit card numbers. In other embodiments, some websites, e.g. a database, may require the user to log in before any substantive contents can be accessed.

In some embodiments, the website may be operated and managed by a same service provider as the browser application. However, in other embodiments, the website the user wants to access may be operated and managed by a third party service provider using a third party server. If the website provides different levels of access for a user that has logged in compared with an anonymous user, it is sometimes desirable for the user to log in the third party server to have better and/or fuller access to data of the third party server. It is also desirable that the user may log in the third party server rapidly in an abbreviated process while accessing the third party server through the browser application.

To automatically log in the third party server without providing additional authentication, a data access request may be generated when the user is trying to access the third party website, e.g. by clicking a hyperlink or entering a URL. Sending the data access request may be triggered by the original setup of the browser application or by a specific action event, e.g. selecting a menu item, by the user. In some embodiments, the data access request is only transmitted when the user intends to log in the third party server. The data access request may include a number of information items such as but not limited to: the user identifier, the session key for a communication session between the client terminal and the main server, a command regarding how the third party server should handle the data access request, and a request related to the purpose of the data access request—to allow the client terminal to access data on the third party server without additional authentication.

The user identifier may refer to any information that may be used to uniquely identify the user and/or the client terminal. In some embodiments, the user identifier may incorporate the account information of the user, wherein the account information includes the user name and password. The user identifier may include information items that are resulted from processing the account information. For example, the main server may establish a corresponding relationship between different users and different user identifiers (e.g. unique codes), wherein the user and the user identifier can be identified by the account information. When the user logs in the browser application and establishes the active communication session, the user identifier is located and transferred to the client terminal so that the client terminal may use the user identifier to request access to third party servers.

As indicated by steps 300 and 301 of FIG. 3, the client terminal may establish and maintain an active communication session with the main server. The communication session may start after the user logs in the account in the browser application. In some embodiments, the communication session allows the client terminal and the main server to exchange information in more secure and/or rapid manner. In some embodiments, the communication session may provide the user with more access to the data on the main server and better protection of the user's privacy and other sensitive information. For each communication session that has been established, the main server may assign a session key, which may be transferred to the client terminal. The main server may keep track of all the active communication sessions by storing the session keys for such sessions in a chart. The active communication session may be maintained by exchanging periodical communication packets between the main server and the client terminal. When a response packet is not received in a preset time period, the main server may consider the communication session no longer active and remove the session key corresponding to the communication session from the chart. In some embodiments, the active communication session may be determined by the login time.

As shown by step 201 of FIG. 2 and step 100 of FIG. 1, the third party server may send a validation request to the main server, wherein the validation request comprises a third party identifier, the user identifier, and the session key. In some embodiments, the operators of the third party server and the main server may have agreements that allow abbreviated login to the third party server by the users having registered accounts of the browser application. In some embodiments, the validation request may be used to verify that the data access request is actually from a qualified user of the browser application and the main server. As indicated, the validation request may include a number of information items, such as but not limited to: a third party identifier, the session key, and the user identifier. In addition, the validation request may also include a request for the main server to verify that the user identifier indicates a valid user and the session key identifies an active communication session. In some embodiments, the validation request may include less information items as indicated above. For example, the validation request may include the session key without the user identifier because having a session key indicates that the user has successfully logged in the main server through the browser application account.

The third party identifier may be used to uniquely identify the third party server, the services that may be provided by the third party server, and/or the third party service provider. In some embodiments, the third party identifier may be used by the main server to determine whether there is a valid agreement between the main server and the third party server to allow abbreviated login to the third party server. However, in some embodiments, such a bi-lateral agreement is not indispensible and the third party server may be allowed to unilaterally set up an abbreviated login process, which allows the active user of the browser application to log in the third party server without additional authentication. In addition to verification, the third party identifier may be used to point to the third party server so that the main server may communicate with the correct service provider.

As shown by step 101 of FIG. 1, the main server may determine whether there is an active communication session between the server and the client terminal corresponding to the session key. As indicated, the session keys corresponding to active communication sessions may be stored by the main server. Upon receiving the validation request, the main server may extract the session key from the validation request and search the session keys for the active communication sessions. If the session key from the validation request is found, then there is an active communication session between the main server and the client terminal, verifying that the user is a valid and active user of the main server through an account of the browser application.

In some embodiments, the active communication session may be maintained by the exchanges between the client terminal and the main server. In some embodiments, whether the communication session is active may be determined by the login time. If the main server determines that there is no active communication session corresponding to the session key, the main server may deny the validation request and send a notice to the third party server, indicating that a full login should be considered by the third party server to grant access to the client terminal. Alternatively, the main server may send a warning to the client terminal to alert that the communication session is no longer active so that the login access to the third party server may not be granted; then the main server may wait for a preset period of time, allowing the possibility that the client terminal re-establishes an active communication session; in that the case, the main server may grant the validation request and transfer the session key for the new active communication session to the third party server.

As shown by step 102 of FIG. 1, the main server may send an authorization request to the third party server based on the third party identifier in accordance with a determination that the communication session is an active session. In some embodiments, the authorization request may include information items such as the session key. In other embodiments, the authorization request may not include the session key. The authorization request may notify the third party server that an active communication session exists between the main server and the client terminal. Moreover, the third party server may be configured to allow the client terminal to access a predefined portion of data associated with the user identifier through the browser application without further validating the data access request.

Step 202 of FIG. 2 indicates that the third party server may receive the authorization request from the main server and the third party server. In addition, step 203 shows that the third party server may send an authorization notice to the client terminal after receiving the authorization request. In some embodiments, the third party server may allow the client terminal to log in without additional verification of the data access request so that the client terminal may access a predefined portion of data in the third party server.

Sending the authorization notice is an optional step. In some embodiments, the access to the predefined portion of data at the third party server is granted without direct notification to the client terminal. In some embodiments, the authorization notice is sent and the client terminal may receive the notice from the third party server as indicated by step 302 of FIG. 3. In addition, the client terminal may also optionally display the authorization notice as a login success status.

The predefined portion of data may be defined by the third party server or may be resulted from the agreement between the third party server and the main server. For example, for a shopping website, the predefined portion of data may refer to non-sensitive or non-essential data such as merchandise listings, purchasing records, or favorite items. In some embodiments, the predefined portion of data that can be accessed by the client terminal without further authorization and may not include any private information of the user such as address or information related to the completion of a financial transaction, such as credit numbers or Paypal® account names. The scope of the predefined portion of data may vary to balance convenience and security of the user.

The third party server may set different levels of accessibility to the data in the third party server in accordance to the level of authentication of the client terminal and the user through the browser application. For example, an anonymous user may only be able to access the merchandise listings; a user that logs in through the abbreviated process as indicated by steps described above may have access to the user profile, which may include information such as user name, transaction history, and shipping status; a user that provides the full set of registered user name and password may be granted access to more sensitive data outside the predefined portion, such as data related to the completion of a financial transaction, e.g. a purchase.

As shown by step 304 in FIG. 3, the computer system may attempt to access data outside the predefined portion, e.g. private or financial information of the user, transactional records or data related to completion of a financial transaction. Accordingly, as shown by step 204 of FIG. 2, the third party server may require further authentication from the client terminal when the browser application requests to access data outside the predefined portion.

The third party server may send a further authorization request to the client terminal, alerting the user that he/she is trying to gain access to data outside the predefined portion and requiring the user to enter further authentication. In some embodiments, the further authentication may comprise a user name and password for an account specifically registered by the third party server. Alternatively, the further authorization may include a user name and password for the browser application account. As indicated by step 304 of FIG. 3, the client terminal may provide a login phrase, such as a user name, and password for access to data outside the predefined portion.

Figure 4:
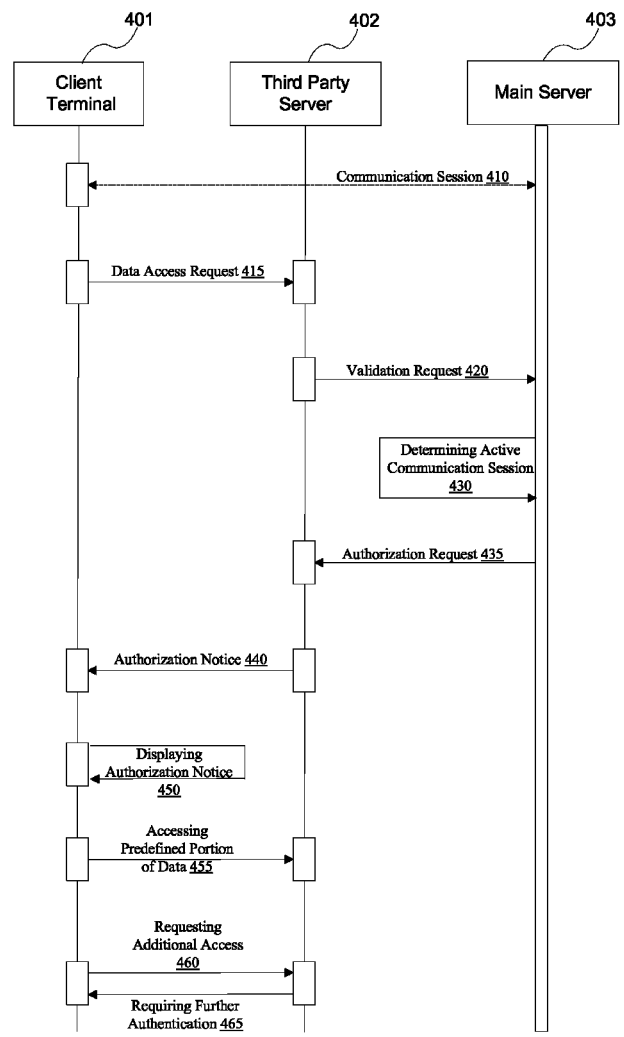
FIG. 4 is a schematic illustration of how a main server, a third party server, and a client terminal interact and communicate to allow abbreviated third party login in accordance with some embodiments of the current invention.

FIG. 4 is a schematic illustration of how a main server 403, a third party server 402, and a client terminal 401 interact and communicate to allow abbreviated third party login in accordance with some embodiments of the current invention.

As shown by FIG. 4, the main server 403 and the client terminal 401 may establish an active communication session 410 through a browser application, wherein the active communication session 410 involves information exchanges between the main server 403 and the client terminal 401. In addition, the client terminal 401 may provide account information, such as a user name and a password, for the browser application when the communication session is established. A session key may also be assigned to the communication session 410.

After establishing the communication session 410, the client terminal 401 may attempt to access a third party website through the browser application, wherein the third party website is managed by a third party server 402. The client terminal 401 may send a data access request 415 to the third party server 402, wherein the data access request 410 comprises a user identifier for the user account with the browser application, as well as a session key for the communication session 410.

After receiving the data access request 415 from the client terminal 401, the third party server 402 may send a validation request 420 to the main server 403, wherein the validation request 420 may include the user identifier, the session key, and a third party identifier.

Upon receiving the validation request 420 from the third party server 402, in step 430 of FIG. 4, the main server 403 may determine whether there is an active communication session between the server and the client terminal corresponding to the session key. In some embodiments, the main server 403 may determine whether the communication session 410 is still an active session.

In accordance with a determination that the communication session 410 is an active session, the main server 403 may send an authorization request 435 to the third party server 402 based on the third party identifier. In some embodiments, the authorization request 435 comprises the session key.

In some embodiments, after receiving the authorization request 435, the third party server 403 may allow the client terminal to access a predefined portion of data associated with the user identifier through the browser application without further validating the data access request. In addition, the third party server 403 may send an authorization notice 440 to the client terminal 401 so that in step 450 of FIG. 4, the client terminal 401 may display the authorization notice 440 to show login success.

As indicated, in step 455 of FIG. 4, the client terminal 401 may access a predefined portion of data associated with the user identifier through the browser application without further validating the data access request 410. In some embodiments, the client terminal 401 may access a portion of the data in the third party server whereas the user does not need to manually enter the login information for an account at the third party server 402.

As shown by steps 460 and 465 of FIG. 4, when the client terminal 401 is attempting to access data outside the predefined portion, such as information related to the completion of financial transaction, the third party server 402 may require the client terminal 401 to provide further authentication, wherein the further authentication may comprise a login phrase and a password.

FIGS. 5-9 illustrate the devices and system that may be used to perform the methods described in FIGS. 1-4. To avoid redundancy, not all the details and variations described for the method are herein included for the computer system. Such details and variations should be considered included for the description of the devices as long as they are not in direct contradiction to the specific description provided for the methods.

Figure 5:
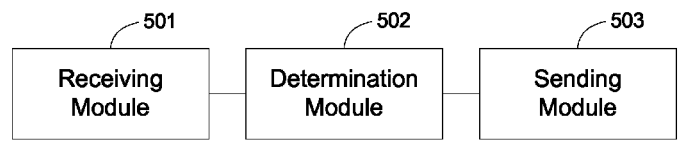
FIG. 5 is a block diagram of a main server having multiple modules in accordance with some embodiments of the current invention.

FIG. 5 is a block diagram of a main server having multiple modules in accordance with some embodiments of the current invention. The main server may comprise one or more processors; memory; and one or more programs modules stored in the memory and configured for execution by the one or more processors, the one or more program modules including: a receiving module 501 configured to receive a validation request from a third party server, wherein the validation request is triggered by a data access request from the browser application at the client terminal to the third party server and the validation request comprises a third party identifier, a user identifier, and a session key; a determination module 502 configured to determine whether there is an active communication session between the server and the client terminal corresponding to the session key; and a sending module 503 configured to send an authorization request to the third party server based on the third party identifier, in accordance with a determination that the communication session is an active session, the authorization request including the session key, wherein the third party server is configured to allow the client terminal to access a predefined portion of data associated with the user identifier through the browser application without further validating the data access request.

As indicated, the data access request may comprise the user identifier and the session key. The third party server may require further authentication from the client terminal when the browser application requests to access sensitive data outside the predefine portion in the third party server. In some embodiments, the sensitive data is related to private information of the user or completion of a financial transaction. In some embodiments, the further authentication comprises a log in phrase and a password. In addition, the third party server may send an authorization notice to the client terminal after receiving the authorization request, wherein the client terminal may display the authorization notice as a log in success status. In addition, in some embodiments, a login time period associated with the client terminal is used to determine whether there is an active communication session between the server and the client terminal corresponding to the session key.

Figure 6:
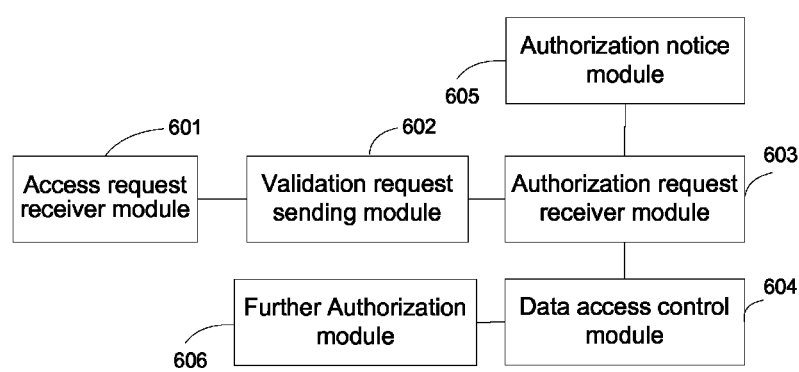
FIG. 6 is a block structural diagram of a third party server having multiple modules in accordance with some embodiments of the current invention.

FIG. 6 is a block structural diagram of a third party server having multiple modules in accordance with some embodiments of the current invention. The third party server may comprise an access request receiver module 601, a validation request sending module 602, an authorization request receiver module 603, a data access control module 604, an authorization notice module 605, and a further authorization module 606, wherein the access request receiver module 601 is configured to receive a data access request from a client terminal, the validation request sending module 602 is configured to send a validation request to a main server, the authorization request receiver module 603 is configured to receive an authorization request from the main server, the data access control module 604 is configured to allow the client terminal to access a predefined portion of data associated with the user identifier through the browser application without further validating the data access request, an authorization notice module 605 is configured to send an authorization notice to the client terminal, and the further authorization module 606 is configured to require further authentication from the client terminal when the browser application requests to access data outside the predefined portion, e.g. private or financial information of the user, transactional records or data related to completion of a financial transaction.

Figure 7:
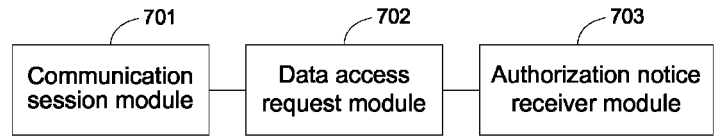
FIG. 7 is a block diagram of a client terminal having multiple modules in accordance with some embodiments of the current invention.

FIG. 7 is a block diagram of a client terminal having multiple modules in accordance with some embodiments of the current invention. The client terminal may comprise a communication session module 701, a data access request module 702, and an authorization notice receiver module 703, wherein the communication session module 701 is configured to establish and maintain an active communication session with the main server, the data access request module 702 is configured to send a data access request to the third party server, and the authorization notice receiver module 703 is configured to receive an authorization notice from the third party server and/or display the authorization notice.

Figure 8:
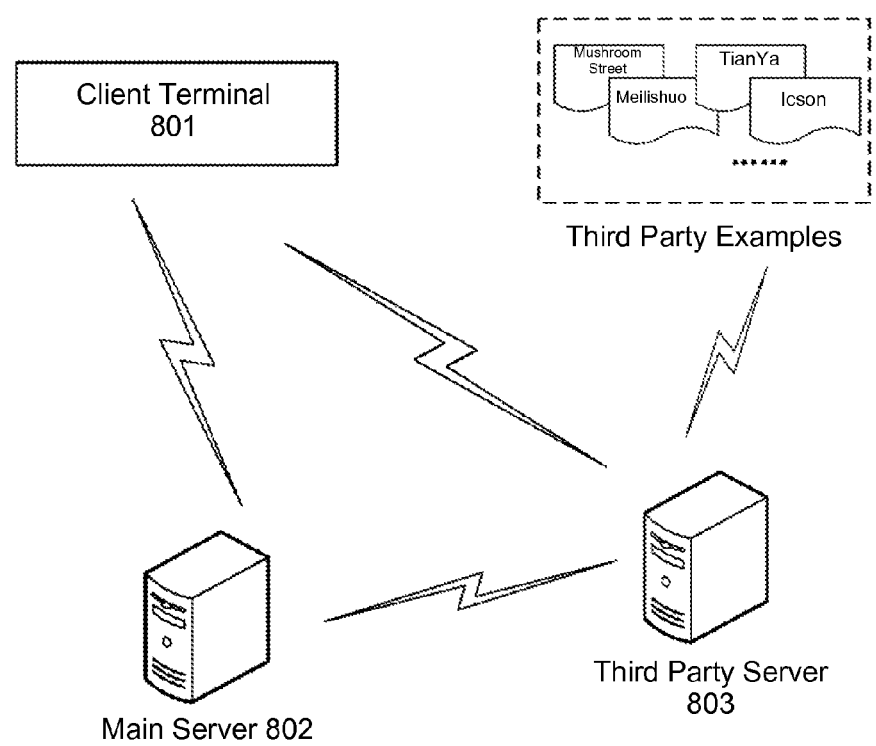
FIG. 8 is a schematic structural diagram of a system for third party login operations in accordance with some embodiments of the current invention.

FIG. 8 is a schematic structural diagram of a system for third party login operations in accordance with some embodiments of the current invention.

The client terminal 801 may be configured to: log in the main server 802 and establish an active communication session with the main server 802; send a data access request to a third party server 803 and maintain the active communication session with the main server 802, wherein the data access request comprises a user identifier and a session key; receive an authorization notice from the third party server 803 and access a predefined portion of data associated with the user identifier in the third party server 803 through the browser application without further validation. The client terminal 801 may also display the authorization notice as a login success status. In some embodiments, when the client terminal 801 attempts to access data outside the predefined portion, e.g. private or financial information of the user, transactional records or data related to completion of a financial transaction, the client terminal 801 may be required to provide a login phrase and password for the additional access.

The main server 802 may be configured to: receive a validation request from a third party server 803, wherein the validation request is triggered by a data access request from the browser application at the client terminal 801 to the third party server 803 and the validation request comprises a third party identifier, a user identifier, and a session key; determine whether there is an active communication session between the main server 802 and the client terminal 801 corresponding to the session key; and in accordance with a determination that the communication session is an active session, send an authorization request to the third party server 802 based on the third party identifier, the authorization request including the session key, wherein the third party server 802 is configured to allow the client terminal 801 to access a predefined portion of data associated with the user identifier through the browser application without further validating the data access request.

The third party server 803 may be configured to: receive a data access request through a browser application at the client terminal 801, wherein the data access request comprises a user identifier and a session key; send a validation request to the main server 802, wherein the validation request comprises a third party identifier, the user identifier, and the session key; and receive an authorization request from the main server 802, the authorization request including the session key. In addition, the third party server 803 may send an authorization notice to the client terminal 801 and allow the client terminal 801 to log in without further validation of the data access request so that the client terminal 801 can access a predefined portion of data associated with the user identifier through the browser application. The third party server 803 may require further authentication from the client terminal 801 when the browser application requests to access data outside the predefined portion, e.g. private or financial information of the user, transactional records or data related to completion of a financial transaction. Examples of the third party server 803 may include Mushroom Street®, Meilishuo®, TianYa®, and Icson®.

Figure 9:
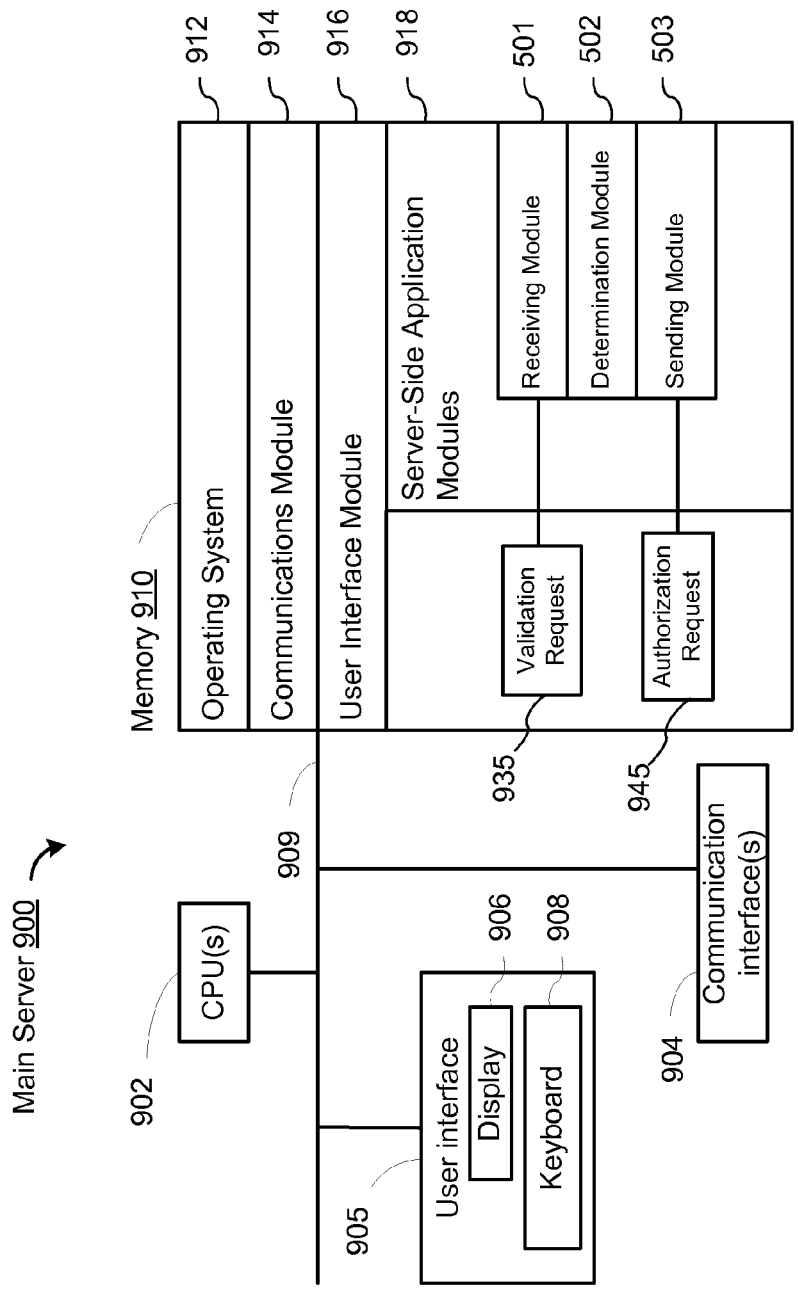
FIG. 9 is a block diagram of a server in accordance with some embodiments of the current invention.

FIG. 9 is a block diagram of a computer system, e.g. a main server, in accordance with some embodiments of the current invention. The exemplary main server 900 typically includes one or more processing units (CPU's) 902, one or more network or other communications interfaces 904, memory 910, and one or more communication buses 909 for interconnecting these components. The communication buses 909 may include circuitry (sometimes called a chipset) that interconnects and controls communications between system components. The main server 900 may include a user interface 905, for instance, a display 906 and a keyboard 908. Memory 910 may include high speed random access memory and may also include non-volatile memory, such as one or more magnetic disk storage devices. Memory 910 may include mass storage that is remotely located from the CPU's 902. In some embodiments, memory 910 stores the following programs, modules and data structures, or a subset or superset thereof:

- an operating system 912 that includes procedures for handling various basic system services and for performing hardware dependent tasks;
- a network communication module 914 that is used for connecting the main server 900 to the terminal or other computers via one or more communication networks (wired or wireless), such as the Internet, other wide area networks, local area networks, metropolitan area networks, and so on;
- a user interface module 916 configured to receive user inputs through the user interface 905;
- and a number of application modules 918 including the following:
- a receiving module 501 configured to receive a validation request 935 from a third party server, wherein the validation request 935 is triggered by a data access request from the browser application at the client terminal to the third party server and the validation request 935 comprises a third party identifier, a user identifier, and a session key;
- a determination module 502 configured to determine whether there is an active communication session between the server and the client terminal corresponding to the session key; and
- a sending module 503 configured to send an authorization request 945 to the third party server based on the third party identifier, in accordance with a determination that the communication session is an active session, the authorization request 945 including the session key, wherein the third party server is configured to allow the client terminal to access a predefined portion of data associated with the user identifier through the browser application without further validating the data access request.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method performed at a main server having one or more processors and memory storing programs executed by the one or more processors, wherein the main server is communicatively connected to a client terminal and a third party server, respectively:
   receiving a validation request from the third party server, wherein the validation request is triggered by a data access request from a browser application at the client terminal to the third party server and the validation request comprises a third party identifier, a user identifier, and a session key;
   determining whether there is an active communication session between the main server and the client terminal corresponding to the session key; and
   in accordance with a determination that the communication session is an active session, sending an authorization request to the third party server based on the third party identifier, the authorization request including the session key, wherein the third party server is configured to allow the client terminal to access a predefined portion of data associated with the user identifier through the browser application without further validating the data access request and require further authentication by the main server from the client terminal when the browser application requests to access sensitive data outside the predefine portion in the third party server.

2. The method of claim 1, wherein:
   the data access request comprises the user identifier and the session key.

3. The method of claim 1, wherein:
   the sensitive data is related to private information of the user or completion of a financial transaction.

4. The method of claim 1, wherein:
   the further authentication comprises a login phrase and a password.

5. The method of claim 1, wherein:
   the third party server sends an authorization notice to the client terminal after receiving the authorization request.

6. The method of claim 5, wherein:
   the client terminal displays the authorization notice as a log in success status.

7. The method of claim 1, wherein:
   a login time period associated with the client terminal is used to determine whether there is an active communication session between the main server and the client terminal corresponding to the session key.

8. A main server that is communicatively connected to a client terminal and a third party server, respectively, the main server comprising:
   one or more processors;
   memory; and
   one or more programs modules stored in the memory and configured for execution by the one or more processors, the one or more program modules including:
   a receiving module configured to receive a validation request from the third party server, wherein the validation request is triggered by a data access request from a browser application at the client terminal to the third party server and the validation request comprises a third party identifier, a user identifier, and a session key;
   a determination module configured to determine whether there is an active communication session between the main server and the client terminal corresponding to the session key; and
   a sending module configured to send an authorization request to the third party server based on the third party identifier, in accordance with a determination that the communication session is an active session, the authorization request including the session key, wherein the third party server is configured to allow the client terminal to access a predefined portion of data associated with the user identifier through the browser application without further validating the data access request and require further authentication by the main server from the client terminal when the browser application requests to access sensitive data outside the predefine portion in the third party server.

9. The main server of claim 8, wherein:
   the data access request comprises the user identifier and the session key,
   the third party server comprises a further authorization module configured to require further authentication by the main server from the client terminal when the browser application requests to access sensitive data outside the predefine portion in the third party server.

10. The main server of claim 8, wherein:
    the sensitive data is related to private information of the user or completion of a financial transaction.

11. The main server of claim 8, wherein:
    the further authentication comprises a login phrase and a password.

12. The main server of claim 8, wherein:
    the third party server comprises a authorization notice module configured to send an authorization notice to the client terminal after receiving the authorization request.

13. The main server of claim 12, wherein:
    the client terminal displays the authorization notice as a log in success status.

14. The main server of claim 8, wherein:
    a login time period associated with the client terminal is used to determine whether there is an active communication session between the main server and the client terminal corresponding to the session key.

15. A non-transitory computer readable storage medium having stored therein one or more instructions, which, when executed by a main server that is communicatively connected to a client terminal and a third party server, respectively, cause the main server to:
    receive a validation request from the third party server, wherein the validation request is triggered by a data access request from a browser application at the client terminal to the third party server and the validation request comprises a third party identifier, a user identifier, and a session key;
    determine whether there is an active communication session between the main server and the client terminal corresponding to the session key; and
    in accordance with a determination that the communication session is an active session, send an authorization request to the third party server based on the third party identifier, the authorization request including the session key, wherein the third party server is configured to allow the client terminal to access a predefined portion of data associated with the user identifier through the browser application without further validating the data access request and require further authentication by the main server from the client terminal when the browser application requests to access sensitive data outside the predefine portion in the third party server.

16. The non-transitory computer readable storage medium of claim 15, wherein:
the third party server sends an authorization notice to the client terminal after receiving the authorization request.

17. The non-transitory computer readable storage medium of claim 15, wherein:
a login time period associated with the client terminal is used to determine whether there is an active communication session between the main server and the client terminal corresponding to the session key.

* * * * *